United States Patent
Sellner et al.

(10) Patent No.: US 11,498,765 B2
(45) Date of Patent: Nov. 15, 2022

(54) WAREHOUSING AND ORDER FULFILLMENT SYSTEMS AND METHODS

(71) Applicant: Target Brands, Inc., Minneapolis, MN (US)

(72) Inventors: David Sellner, Minneapolis, MN (US); Kevin Vliet, Minneapolis, MN (US); Arthur Valdez, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 153 days.

(21) Appl. No.: 17/193,726

(22) Filed: Mar. 5, 2021

(65) Prior Publication Data

US 2021/0188552 A1  Jun. 24, 2021

Related U.S. Application Data (63) Continuation of application No. 16/190,866, filed on Nov. 14, 2018, now Pat. No. 10,947,045.

(60) Provisional application No. 62/589,291, filed on Nov. 21, 2017.

(51) Int. Cl.
  *B65G 1/137*   (2006.01)
  *G06Q 10/08*   (2012.01)

(52) U.S. Cl.
  CPC ......... *B65G 1/1373* (2013.01); *B65G 1/1378* (2013.01); *G06Q 10/087* (2013.01)

(58) Field of Classification Search
  CPC ... B65G 1/1373; B65G 1/1378; G06Q 10/087
  See application file for complete search history.

(56) References Cited

U.S. PATENT DOCUMENTS

| | | | |
|---|---|---|---|
| 5,996,316 A | 12/1999 | Kirschner | |
| 6,889,197 B2 | 5/2005 | Lidow | |
| 9,002,506 B1 * | 4/2015 | Agarwal | G06Q 10/087 700/218 |
| 9,242,799 B1 * | 1/2016 | O'Brien | G06Q 50/28 |
| 9,378,482 B1 * | 6/2016 | Pikler | B65G 1/0492 |
| 9,733,646 B1 * | 8/2017 | Nusser | B65G 57/03 |
| 2002/0042755 A1 | 4/2002 | Kumar et al. | |

(Continued)

FOREIGN PATENT DOCUMENTS

| | | |
|---|---|---|
| FR | 3048238 | 9/2017 |
| WO | WO 2017/027751 | 2/2017 |
| WO | WO 2017/138377 | 8/2017 |

OTHER PUBLICATIONS

PCT International Preliminary Report on Patentability in International Appln. No. PCT/US2018/061023, dated May 26, 2020, 10 pages.

(Continued)

*Primary Examiner* — Kyle O Logan
(74) *Attorney, Agent, or Firm* — Fish & Richardson P.C.

(57) ABSTRACT

Warehouse automation and methods of controlling material flow can be used to streamline order fulfillment. For example, according to some embodiments described herein, a method includes: causing a first mobile robot to engage with and transport a mobile storage unit to a robotic picking cell, causing a second mobile robot to engage with and transport an outbound container to the robotic picking cell, and causing the picking robot to transfer a sellable unit from the mobile storage unit to the outbound container.

20 Claims, 2 Drawing Sheets

(56) References Cited

U.S. PATENT DOCUMENTS

| | | | |
|---|---|---|---|
| 2003/0171962 A1 | 9/2003 | Hirth et al. | |
| 2007/0021864 A1* | 1/2007 | Mountz | G06Q 10/087 700/216 |
| 2008/0167884 A1* | 7/2008 | Mountz | G06Q 10/0833 705/29 |
| 2013/0054005 A1* | 2/2013 | Stevens | G06Q 10/087 700/216 |
| 2013/0173049 A1* | 7/2013 | Brunner | B65G 1/1378 700/216 |
| 2014/0214195 A1* | 7/2014 | Worsley | B65G 1/10 700/217 |
| 2016/0145044 A1 | 5/2016 | Mountz et al. | |
| 2016/0229631 A1* | 8/2016 | Kimura | G06Q 10/08 |
| 2016/0236869 A1* | 8/2016 | Kimura | B65G 1/1378 |
| 2017/0043953 A1* | 2/2017 | Battles | B65G 1/04 |
| 2018/0365631 A1* | 12/2018 | Moulin | G08G 1/20 |
| 2019/0152703 A1 | 5/2019 | Sellner et al. | |

OTHER PUBLICATIONS

PCT International Search Report and Written Opinion in International Appln. No. PCT/US2018/061023, dated Feb. 22, 2019, 16 pages.

\* cited by examiner

WAREHOUSING AND ORDER FULFILLMENT SYSTEMS AND METHODS

CROSS-REFERENCE TO RELATED APPLICATIONS

This application claims the benefit of U.S. patent application Ser. No. 16/190,866 filed on Nov. 14, 2018, which claims the benefit of U.S. Provisional Application Ser. No. 62/589,291 filed Nov. 21, 2017. The disclosure of the prior applications are considered part of (and are incorporated by reference in) the disclosure of this application.

TECHNICAL FIELD

This document relates to systems and methods for enhancing efficiencies of order fulfillment processes. For example, this document relates to warehouse automation and methods of controlling material flow to streamline order fulfillment processes.

BACKGROUND

Very few things can alienate a customer more than not having their order fulfilled properly and promptly. Two-day deliveries are currently standard, and customers are often willing to pay extra for same-day or next-day deliveries. Highly efficient warehousing, order assemblage, and shipping processes are on the frontline of meeting these high level of customer expectations.

The order fulfillment process refers to all the steps companies take from when they receive a customer order (which can include an order that is wholly or partly internal to the company, such as a store replenishment order) until the items are landed in customers' hands. Such steps can include, for example: the order is sent to the warehouse; a worker goes into the warehouse, finds the items in the order, and picks the items off the shelf; the order is packed for shipping; the order is shipped.

The use of warehouse automation is one way to increase the efficiency of an order fulfillment process. The goal of automation is to cut out manual steps of the order fulfillment process. Automation technology is useful for at least two reasons: to help reduce the occurrences of human error, and to make processes more efficient.

SUMMARY

This document describes systems and methods for enhancing efficiencies of order fulfillment processes. For example, this document describes warehouse automation and methods of controlling material flow to streamline and expedite order fulfillment processes in a cost-effective manner.

In one aspect, this disclosure is directed to an order fulfillment system that includes a dense inventory storage system, an automated order assemblage system, and a control system. The dense inventory storage system can include: a plurality of robotically-movable and/or manually-movable mobile storage units consolidated in an area (each mobile storage unit can define one or more storage locations); a plurality of sellable unit containers (each sellable unit container can be located in a respective one of the storage locations); and a plurality of differing types of sellable units (each sellable unit container containing one or more of a single type of the sellable units, or of two or more types of sellable units). The automated order assemblage system can include: one or more first mobile robots that each releasably engage and transport any individual mobile storage unit; one or more second mobile robots that each releasably engage and transport any individual sellable unit container; a plurality of outbound containers; one or more third mobile robots that each releasably engage and transport any individual outbound container; and a robotic picking cell. The robotic picking cell can be adapted to receive: (i) individual second mobile robots transporting an engaged sellable unit container and (ii) individual third mobile robots transporting an engaged outbound container. The robotic picking cell can include a picking robot configured to transfer one or more individual sellable units from a respective one of the sellable unit containers in the robotic picking cell to a respective one of the outbound containers in the robotic picking cell. The control system can be operable, in response to receiving an order for a particular sellable unit of the sellable units, to: (i) cause one of the first mobile robots to engage and transport a particular mobile storage unit (the particular mobile storage unit storing a particular sellable unit container containing the particular sellable unit); (ii) cause one of the second mobile robot to engage and transport the particular sellable unit container to the robotic picking cell; and/or (iii) cause the picking robot to transfer the particular sellable unit into a particular outbound container.

Such an order fulfillment process can optionally include one or more of the following features. The order fulfillment system may also include an automated container transfer system configured to transfer individual sellable unit containers from the mobile storage units in preparation for engagement of the individual sellable unit containers with respective individual second mobile robots. The order fulfillment system may also include a conveyance system that inducts the plurality of sellable unit containers to the dense inventory storage system. The order fulfillment system may also include an automated container transfer system configured to transfer individual sellable unit containers from the conveyance system to respective individual storage locations of the mobile storage units. The control system may be also operable, in response to receiving an order for a particular sellable unit of the sellable units, to cause one of the third mobile robots to engage the particular outbound container and to transport the particular outbound container to the robotic picking cell to receive the particular sellable unit from the picking robot. The order fulfillment system may also include an outbound buffer area where multiple ones of the outbound containers that are ready for shipment are staged. The control system may be also operable to determine an optimized sequence in which the multiple ones of the outbound containers that are ready for shipment should be loaded into an outbound trailer. The optimized sequence may be based on an efficient technique for stocking shelves of a retail store.

In another aspect, this disclosure is directed to a method for preparing for a shipment of an order that includes a first sellable unit. The method can be executed by a control system in response to receiving the order. The method includes: causing a first mobile robot to engage with and transport a particular mobile storage unit of a plurality of robotically-movable mobile storage units located in, or retrieved from, a dense storage area. Each of the mobile storage units may define one or more storage locations that can each receive a sellable unit container. The particular mobile storage unit can store a first sellable unit container containing the first sellable unit. The method can also include causing a second mobile robot to engage with and transport the first sellable unit container to a robotic picking cell comprising a picking robot. The method can also include causing a third mobile robot to engage with and transport a particular outbound container to the robotic picking cell, and/or causing the picking robot to transfer the first sellable unit from the first sellable unit container to the particular outbound container.

Such a method may optionally include one or more of the following features. The order may also include a second sellable unit that differs from the first sellable unit. The method may also include: causing the second mobile robot to transfer the first sellable unit container out of the robotic picking cell; causing a fourth mobile robot to engage with a second sellable unit container containing the second sellable unit and to transport the second sellable unit container to the robotic picking cell. The method may also include causing the picking robot to transfer the second sellable unit from the second sellable unit container to the particular outbound container. The method may also include: prior to causing the picking robot to transfer the second sellable unit from the second sellable unit container to the particular outbound container, causing the third mobile robot to transfer the particular outbound container containing the first sellable unit out of the robotic picking cell, and subsequently causing the third mobile robot or another mobile robot to transfer the particular outbound container containing the first sellable unit to the robotic picking cell. The method may also include: prior to causing the picking robot to transfer the second sellable unit from the second sellable unit container to the particular outbound container, causing the third mobile robot to keep the particular outbound container containing the first sellable unit in the robotic picking cell during: (i) the causing the second mobile robot to transfer the first sellable unit container out of the robotic picking cell and/or (ii) the causing the fourth mobile robot to transport the second sellable unit container containing the second sellable unit to the robotic picking cell.

In another aspect, this disclosure is directed to an order fulfillment system that includes: (i) a plurality of sellable unit containers; (ii) a plurality of differing types of sellable units, each sellable unit container containing one or more of a single type of the sellable units; (iii) a plurality of outbound containers; (iv) one or more mobile container robots that each releasably engage and transport any individual sellable unit container or any individual outbound container; and/or (v) a robotic picking cell comprising a picking robot configured to transfer one or more individual sellable units from a respective one of the sellable unit containers in the robotic picking cell to a respective one of the outbound containers in the robotic picking cell.

Such an order fulfillment system may optionally include one or more of the following features. The robotic picking cell may be adapted to concurrently receive: (i) an individual mobile container robot transporting an engaged sellable unit container and/or (ii) an individual mobile container robot transporting an engaged outbound container. The order fulfillment system may also include: a plurality of robotically-movable mobile storage units, each mobile storage unit defining multiple storage locations, each sellable unit container located in a respective one of the storage locations. The order fulfillment system may also include one or more mobile shelf robots that each releasably engage and transport any individual mobile storage unit. The order fulfillment system may also include an automated container transfer system configured to transfer individual sellable unit containers from the mobile storage unit in preparation for engagement of the individual sellable unit containers with respective individual mobile container robots.

The systems and processes described here may be used to provide one or more of the following optional benefits. First, some embodiments provide an order fulfillment process that is more responsive and agile so orders can be shipped to internal and external customers in a shorter timeframe than current processes. Such a result can be accomplished, for example, through optimizing material flow by reducing delays and interferences. Second, some embodiments allow multiple types of orders to be processed and fulfilled using the same (or essentially the same) order fulfillment process. For example, direct-to-customer shipments, store replenishment orders, customer pick-up-at-store orders, forward deployment of inventory shipments, inventory transfers, and the like can be advantageously processed and fulfilled using essentially the same process. Third, inventory carrying costs can be reduced by the added efficiencies provided by the systems and processes described herein. Fourth, the accuracy of order fulfillment processes can be enhanced by eliminating human errors using the automated systems and processes described herein. Fifth, labor costs associated with the order fulfillment processes can be reduced using the automated systems and processes described herein. Sixth, warehouse space requirements can be reduced using the automated systems and processes described herein.

Other features, aspects and potential advantages will be apparent from the accompanying description and figures.

DESCRIPTION OF DRAWINGS

Like reference symbols in the various drawings indicate like elements

DETAILED DESCRIPTION

This document describes systems and methods for enhancing efficiencies of order fulfillment processes. For example, this document describes the daily replenishment and movement of inventory generated from real-time demand singles for in-store retail sales and direct-to-guest on-line sales fulfilled from a multi-echelon inventory holding model at the correct unit of measure, using fast and easy material handling equipment that will create operational efficiency at every process step in the supply chain. Said another way, this document also describes warehouse automation and methods of controlling material flow to streamline and to consolidate different types of order fulfillment processes (which can include, for example, orders for direct shipments to consumers, orders that are wholly or partly internal to the company such as a store replenishment orders, and others). In some embodiments described herein, an example method of order fulfillment includes: causing a first mobile robot to engage with and transport a mobile storage unit, causing a second mobile robot to engage with and transport a sellable unit container to a robotic picking cell, causing a third mobile robot to engage with and transport an outbound container to the robotic picking cell, and causing a picking robot to transfer sellable units from the sellable unit containers to the outbound container.

Figure 1:
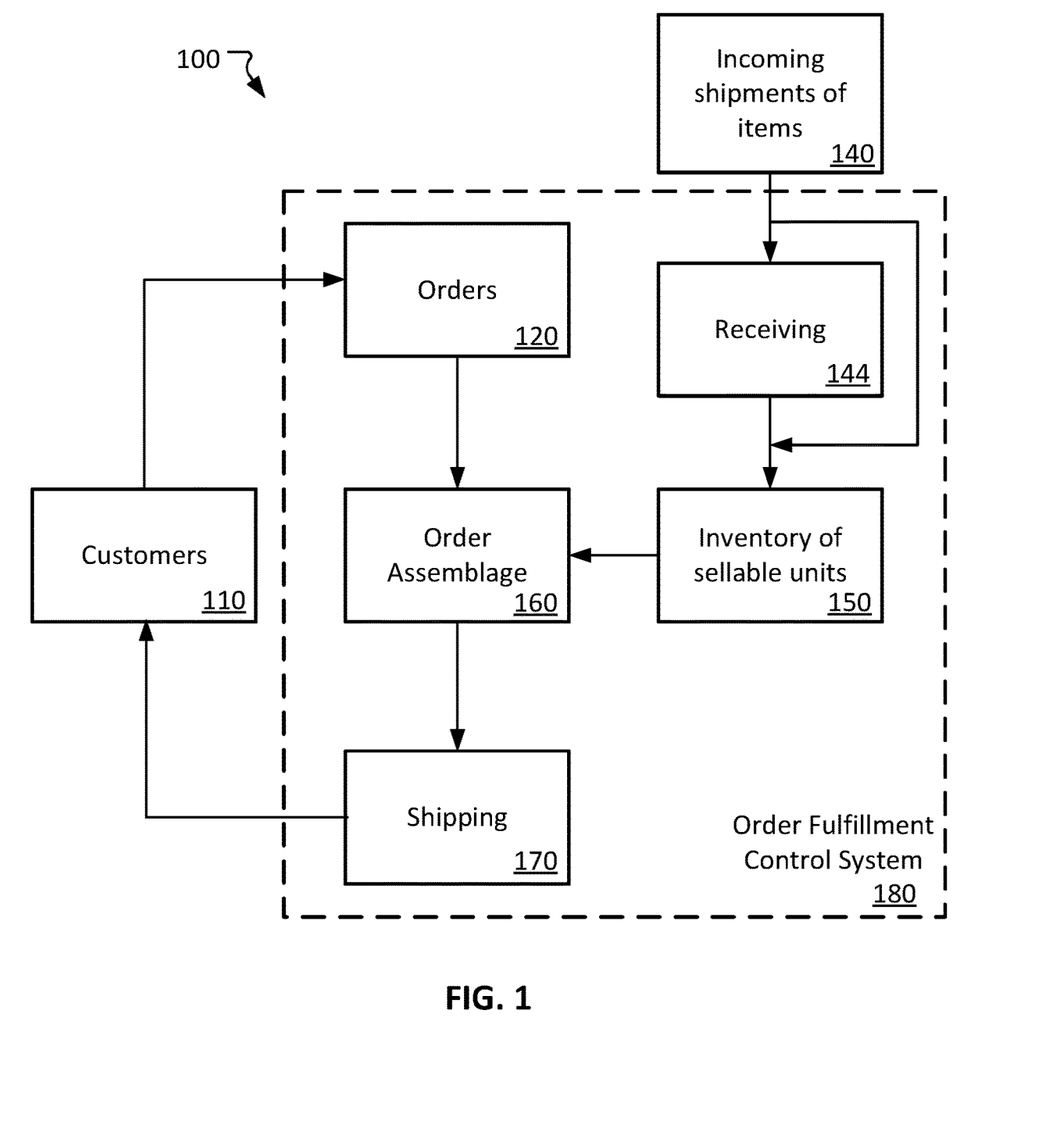
FIG. 1 is a highly-simplified schematic diagram of a basic order fulfillment process.

FIG. 1 depicts a highly-simplified schematic diagram illustrating an example order fulfillment process 100. The order fulfillment process 100 may take place at a variety of different types of facilities such as, but not limited to, flow centers, distribution centers, warehouses, inventory storing locations, order fulfillment centers, receive centers, stores, cross-docking facilities, material handling facilities, and the like, and combinations thereof. In this disclosure, the term "flow center" may be used to refer to any and all such different types of facilities, and combinations thereof. In some examples, the order fulfillment process 100 takes place at a single facility. Alternatively, in some examples execution of the order fulfillment process 100 is distributed across two or more facilities. A flow center as described herein can be a portion of a multi-echelon supply chain.

The flow of sellable items within the overall order fulfillment process 100 is driven by demand for those sellable items from customers 110. In this disclosure, the term "customers" will be used to broadly refer to a variety of different entities such as, but not limited to, individual consumers, retail stores (e.g., for stock replenishment), business partners, other flow centers, and the like.

Tangible orders 120 result from the demand for sellable items from the customers 110. An individual order 120 may be for one unit of a single sellable item, for multiple units of a single sellable item, for two or more different types of sellable items, for a case quantity, for a pallet load, and the like, and any and all possible permutations thereof. Whatever the order 120 includes, the goal of the order fulfillment process 100 is to ship (preferably in a single shipment) all of the sellable items included in the orders 120 in a timely and accurate manner. However, the scope of the order fulfillment process 100 also includes partial shipments that do not include all of the items included in an order 120.

The orders 120 are entered into an order fulfillment control system 180 (represented in FIG. 1 by the dashed-line boundary). In some examples, the order fulfillment control system 180 may be part of and/or may comprise a business management system such as, but not limited to, an enterprise resource planning (ERP) system, a materials management system, an inventory management system, a warehouse management system, one or more automation control systems, and the like, and combinations thereof. Accordingly, the order fulfillment control system 180 (or simply "control system 180") can, in some cases, broadly encompass multiple systems that can be situated locally, remotely, or situated both locally and remotely. The control system 180 can include hardware, software, user-interfaces, and so on. For example, the control system 180 may include one or more computer systems, data storage devices, wired and/or wireless networks, control system software (e.g., programs, modules, drivers, etc.), user interfaces, scanners, communication modules, interfaces for control communications with robots, and the like. Such scanners may include hand-held, mobile, and/or fixed readers that can scan, receive, or otherwise detect marks or tags (e.g., bar codes, radio frequency identification (RFID) tags, etc.) on individual sellable items or collections of sellable items (e.g., cases and totes) and communicate with a control station or stations of the control system 180. The scanners may also be able to scan, receive, or otherwise detect the marks or tags (e.g., bar codes, RFID tags, etc.) attached to or integrated with conveyance receptacles such as inventory totes and boxes.

Still referring to FIG. 1, incoming shipments of items 140 arrive at the flow center. In some cases, the incoming shipments of items 140 are processed by receiving 144 (e.g., the performance of inspections, quantity confirmations/reconciliations, inventory/order control system transactions, etc.). Afterwards, the items enter into inventory 150 of the flow center as sellable units. In some cases, some incoming items go directly from receiving 144 into inventory 150 (e.g., if the incoming items were transferred in from an affiliated facility at which the items were already in the inventory system). The types and quantities of the incoming items 140 may be controlled to keep a desired stock level of the sellable units in the inventory 150 of the flow center. In some cases, the types and quantities of the incoming items 140 may be the result of a proactive inventory transfer (e.g., "pushing" inventory), a reactive inventory transfer (e.g., "pulling" inventory), and/or other such inventory management techniques.

The sellable units in inventory 150 can be located in various types of storage accommodations such as racks, shelves, containers, vessels, carts, bins, totes, pallet lanes, and the like. Such storage accommodations can be individually identified and tracked by the control system 180. That is, the control system 180 can be used to keep track of the quantities in stock of the various sellable items in the inventory 150 and of the inventory location(s) of the various sellable items in the inventory 150. The sellable items in the inventory 150 can be stored in various receptacles such as, but not limited to, boxes, totes, pallets, baskets, bins, bags, and the like.

Next, in the step of order assemblage 160, the sellable item(s) included in the customer order 120 are compiled in preparation for shipment to the respective customer 110. To fulfill the customer orders 120, the one or more items specified in each order may be retrieved, or picked, from inventory 150. Picked sellable items may be delivered or conveyed to one or more areas in the flow center for sorting and assembling into one or more outbound shipping containers for the fulfillment of a respective customer order 120. Outbound shipping containers containing the ordered sellable items are then transported to customers 110 at the step of shipping 170.

FIG. 1 and the foregoing description of the order fulfillment process 100 has provided a high-level overview of the operations of a flow center. Next, in reference to FIG. 2, a much more detailed description focused particularly on the steps of inventory of sellable units 150 and order assemblage 160 will be provided.

Figure 2:
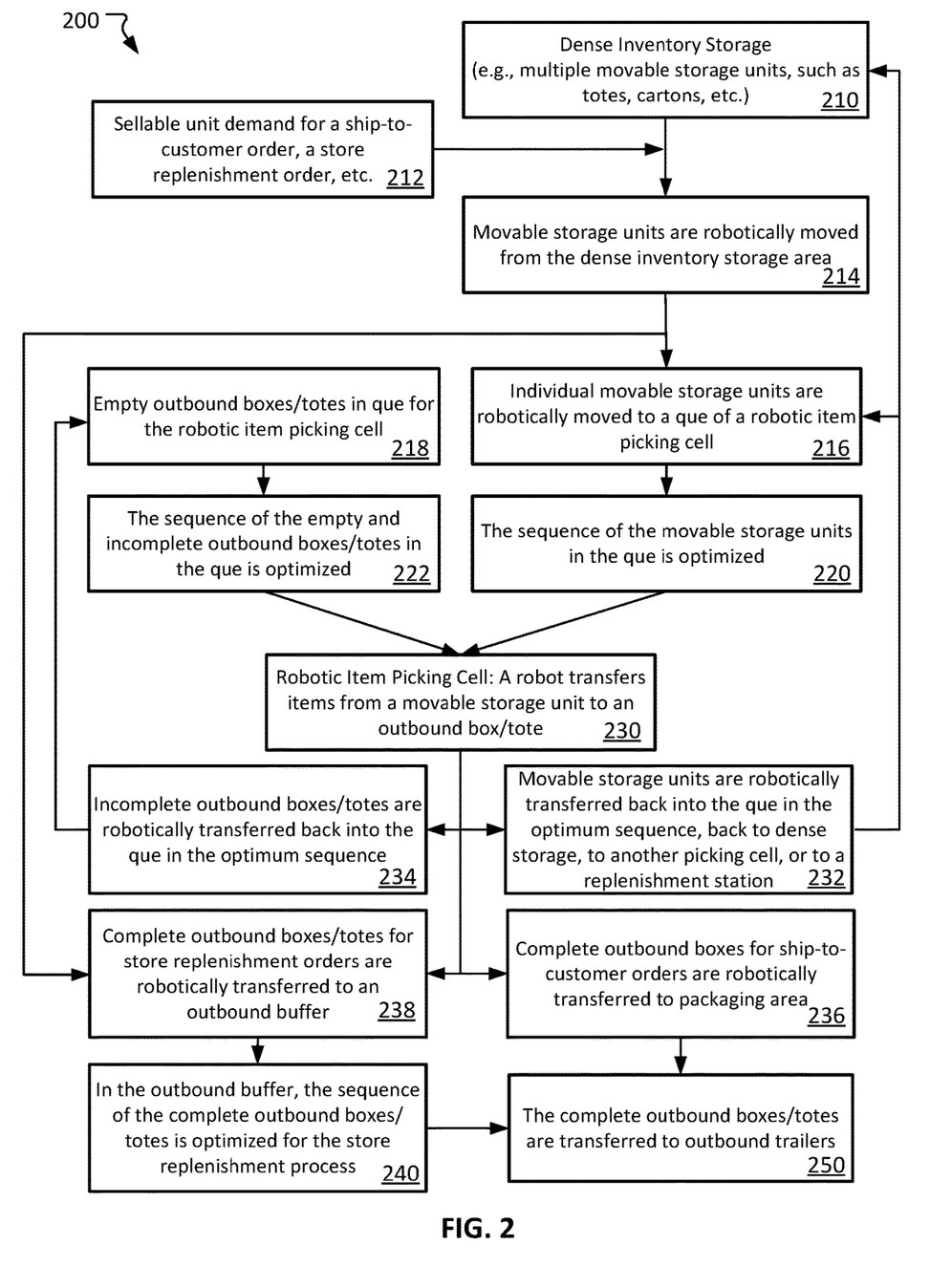
FIG. 2 is a flowchart of an example order fulfillment process in accordance with some embodiments.

FIG. 2 depicts a flowchart of an example order fulfillment process 200 in accordance with some embodiments described herein. It should be understood that any of the concepts, systems, methods, and contexts described above in reference to the order fulfillment process 100 can also analogously apply to the order fulfillment process 200. For example, while not specifically depicted in FIG. 2, it should be understood that the operations of the order fulfillment process 200 involve the use of an order fulfillment control system (such as a warehouse management system, one or more computerized automation/robotic control systems, and/or other such systems that can communicate and coordinate control activities between each other and across the overall order fulfillment process 200). Such an order fulfillment control system can be situated locally, remotely situated, or both locally situated and remotely. From an overview standpoint, the order fulfillment process 200 begins with inventory storage at step 210 and ends with the transfer of completed outbound containers to be shipped to customers for the fulfillment of customer orders at step 250. Order fulfillment process 200 includes the daily replenishment and movement of inventory generated from real-time demand singles for in-store retail sales and direct-to-guest on-line sales fulfilled from a multi-echelon inventory holding model at the correct unit of measure, using fast and easy material handling equipment that will create operational efficiency at every process step in the supply chain.

It should be understood that order fulfillment process 200 allows multiple types of orders to be processed and fulfilled using the same (or essentially the same) order fulfillment process 200. For example, direct-to-customer shipments, store replenishment orders, customer pick-up-at-store orders, forward deployment of inventory shipments, inventory transfers (e.g., proactive inventory transfers, reactive inventory transfers), and the like can be processed and fulfilled using essentially the same order fulfillment process 200. Hence, the order fulfillment process 200 can be considered as a type of omni-channel order fulfillment process.

The flow center's inventory of sellable units can be stored in dense inventory storage 210. In some examples, the dense inventory storage 210 includes a plurality of robotically-movable mobile storage units that are densely consolidated in one or more areas of the flow center. In some examples, the dense inventory storage 210 includes a plurality of manually-movable mobile storage units that are densely consolidated in one or more areas of the flow center. In particular examples, the dense inventory storage 210 includes a combination of: (i) robotically-movable mobile storage units and (ii) manually-movable mobile storage units that are densely consolidated in one or more areas of the flow center. The mobile storage units can be any type of storage unit such as, but not limited to, racks, shelves, totes, carts, bins, cases, cartons, boxes, containers of other types, and the like, and combinations thereof. In some examples, a pallet can be used as for a mobile storage unit.

Each mobile storage unit of the mobile storage units in the dense inventory storage 210 defines one or more storage locations in which inventory of sellable units can be stored and retrieved/picked from. For example, without limitation, a single mobile storage unit (e.g., tote or carton) may define one, two, three, four, five, six, seven, eight, nine, ten, eleven, twelve, fourteen, sixteen, eighteen, twenty, twenty-two, twenty-four, or more than twenty-four individual storage locations in which a particular sellable unit may be stocked in a homogeneous manner or in a heterogeneous manner. That is, in some cases, but not exclusively, the inventory storage locations can be used to store a single sellable unit or sellable unit container that is a homogeneous sellable unit container (e.g., a carton or box containing one and only one type of sellable unit). Alternatively, in some cases, a single sellable unit container that is stored in the inventory storage location is a heterogeneous sellable unit container (e.g., a carton or box containing two or more different types of sellable units that are divided from each other by a physical barrier). In some cases, such heterogeneous sellable unit containers may contain two or more different types of sellable units that are not divided from each other by a physical barrier. The term "inventory tote" can be a mobile storage unit, and can be understood to encompass all such sellable unit containers (e.g., sellable unit containers that are homogeneous as well as sellable unit containers that are heterogeneous (and with or without physical barriers)). A particular mobile storage unit that defines two or more storage locations may have a same type of sellable unit in each of its storage locations, or may have differing types of sellable units in its storage locations.

In some cases, an inventory tote is used to hold multiple sellable items that have been decanted from a vendor's original full case packaging. In other cases, an inventory tote can be used to hold one or more original full case packages of a vendor (each full case package holding a quantity of one or more sellable items), and orders for full cases of one or more items can thereby be fulfilled.

In some cases, the inventory totes are autonomously loaded into respective storage locations of the mobile storage unit in the dense inventory storage 210. Devices and systems such as conveyors, robots, and/or other types of material handling equipment can be used to perform the autonomous loading. In some cases, the inventory totes are stored in the dense inventory storage 210 without being located on a shelf or rack.

The mobile storage units of the dense inventory storage 210 are movable by mobile robots in some embodiments. That is, each individual mobile storage unit can be transported within the flow center by a mobile robot that is adapted to releasably engage with and transport the mobile storage unit. Such actions can be initiated and controlled by the control system(s) that is/are involved with the execution of order fulfillment process 200. In some embodiments, the mobile storage units of the dense inventory storage 210 are movable manually and/or by a mobile robot.

Because the mobile storage units of the dense inventory storage 210 are, in some examples, movable by mobile robots, the mobile storage units can be densely consolidated. Accordingly, floor space within the flow center for inventory storage can be conserved. That is, for example the need for space to allow for traditional material handling equipment like fork trucks, pallet trucks, conveyors, and the like, is reduced because the mobile robots can store the mobile storage units compactly in the dense inventory storage 210.

In some embodiments, the system and/or area making up a portion of, or all of, the dense inventory storage 210 can comprise an automated tote storage and retrieval system with integrated mobile robots, an automatic storage and retrieval system (ASRS), a three-dimensional storage grid/matrix with integrated mobile robots, flow-through racking, and the like, and combinations thereof. The dense inventory storage 210 can be three-dimensional to facilitate multi-level vertical storage. Moreover, aisle space of the dense inventory storage 210 can be minimized or eliminated by the use of some such systems. In some embodiments, such systems can be used to automatically, or semi-automatically, transfer the mobile storage units to one or more physical output points/locations for transport by, or to, the next step of the order fulfillment process 200 or to a conveyance system, for example.

In some embodiments, the dense inventory storage 210 is a single all-in-one system. In some embodiments, the dense inventory storage 210 is comprised of two or more modules of a particular type of system, or of two or more different types of systems.

Sellable unit demand in the form of a customer order 212 is received by the control system of the flow center. The customer order 212 can be of various types such as, but not limited to, a direct ship-to-customer order, a store replenishment order, a pre-emptive placement of inventory order (e.g., to another flow center, to a backroom of a store as forward-deployed inventory, etc.), and the like. In some cases, a store replenishment order or pre-emptive placement of inventory order can be responsive to a customer sale at a store. Accordingly, such an order can be a real-time, demand-based order. It should be understood that the order fulfillment process 200 facilitates, in a consolidated manner, the fulfillment of ship-to-customer orders, the fulfillment of store replenishment orders, the fulfillment of customer pick-up-at-store orders, the fulfillment of forward deployment of inventory shipments, the fulfillment of inventory transfers, and the like, using the same fulfillment systems and processes.

At step 214 of the order fulfillment process 200, in some embodiments the control system causes a mobile robot to move to and engage with a particular mobile storage unit (in the dense storage area or from an output location of the dense storage area) that is storing an inventory of one or more sellable units that are included in the customer order 212. The mobile storage unit may be a tote, carton, pallet, etc., or a rack with multiple totes, cartons, etc. After engaging with the particular mobile storage unit, the mobile robot autonomously transports the mobile storage unit to the que of a robotic item picking cell, or to an extraction area of the flow center. At the extraction area of the flow center, the inventory tote containing the sellable unit(s) that is included in the customer order 212 is removed from the storage location(s) of the mobile storage unit, as needed.

The removal of the inventory tote containing the sellable unit that is included in the customer order 212 from the storage location(s) of the mobile storage unit at the extraction area can be performed in various ways. For example, in some cases the removal can be performed by a robot (e.g., the same robot that transported the mobile storage unit, or a different robot). In some cases, the removal can be performed by other types of autonomous devices/systems. In some cases, the removal can be performed manually by a worker. In some cases the mobile storage unit is an inventory tote, and extraction is not required.

Also at step 214, after the inventory tote is removed from the mobile storage unit if so needed, in some examples the inventory tote then becomes engaged with another mobile robot. In this scenario, the mobile robot is engaging with and transporting a single inventory tote (as compared with the mobile robot mentioned above that can engage with and transport an entire mobile storage unit that may include two or more inventory totes/cases). In some scenarios, the inventory tote is transported by the mobile robot mentioned above.

Step 214 can, alternatively or additionally, encompass the transfer (e.g., using a mobile robot) of a single inventory tote/case from the dense inventory storage 210 (as an alternative to robotically moving a mobile storage unit of two or more homogenous totes/cases to the extraction area). In such a case, the mobile robot that transfers the single inventory tote/case from the dense inventory storage 210 can also be used (but need not be used in every scenario) to facilitate further transfers of the single inventory tote/case as described in the next steps.

Next, at least two different paths can be taken depending on whether the inventory tote containing the sellable unit that is included in the customer order 212 is a tote or a full case of sellable items. If a full case has been ordered by the customer order 212, the mobile robot will transport the full case to the outbound buffer area of the flow center as identified in step 238. The outbound buffer will be explained in further detail below. If the sellable unit that is included in the customer order 212 is contained in an inventory tote, the inventory tote is transported by the mobile robot to a queue of a robotic picking cell as identified in step 216.

At step 216, one or more inventory totes are in a queue awaiting processing by a picking robot in the robotic picking cell (as per step 230 described below). While in the queue at step 216, in some examples all of the inventory totes can remain engaged with a respective mobile robot. Alternatively, in some examples only some (or none) of the inventory totes remain engaged with a mobile robot while in the queue.

At step 218, empty outbound boxes/totes that will receive sellable items for shipment are in a queue awaiting processing by the picking robot in the robotic picking cell (step 230). While in the queue at step 218, in some examples all of the empty outbound boxes/totes remain engaged with a respective mobile robot. Alternatively, in some examples only some (or none) of the empty outbound boxes/totes remain engaged with a mobile robot while in the queue. It should be understood that the shipping containers for both direct-to-customer orders and for store replenishment orders are staged here at step 218 together in the same queue. In some cases, this mixing of direct-to-customer orders and store replenishment orders in the same process may allow for greater utilization of the robotic picking cell process in comparison to processing only one or the other of direct-to-customer orders or store replenishment orders.

In steps 220 and 222, the sequence that will be followed as the inventory totes from step 216 and the outbound boxes/totes from step 218 are processed by the picking robot in the robotic picking cell (step 230) is optimized by the control system of the flow center, the control system of the robotic picking cell, the mobile robot storage controller, another control system, and/or any combination thereof. The optimization of the picking process sequence can be performed by the control system on a periodically-repeated and frequent, on-going basis. It should be understood that this particular aspect allows the order fulfillment process 200 to be highly flexible, agile, responsive, and efficient. That is, the prioritization of certain customer orders 212 over other customer orders 212 can take place up to the very last moment prior to being processed in the picking cell. For example, using this functionality of the order fulfillment process 200, a high priority order can expediently "jump to the front of the line" ahead of other lower priority orders. As another example, an incomplete box/tote that is awaiting one or more additional sellable items that are not immediately available can be prioritized below others so as to avoid constraints to the overall flow of the order assemblage process for outbound shipments. The transportation of the individual inventory totes and outbound boxes/totes by the mobile robots helps facilitate this ability to change the picking cell processing sequence on the fly, and up to the last moment prior to processing in the robotic picking cell. Accordingly, the throughput of the flow center can be optimized, and re-optimized, on an on-going basis so as to best satisfy customer demands and business needs. In some cases, the control system of the flow center, the control system of the robotic picking cell, the mobile robot storage controller, and/or other control systems involved in the performance of the order fulfillment process 200 can utilize machine learning so as to improve the overall performance of the system over time.

At step 230, a picking robot transfers one or more of the sellable items from an inventory tote to an outbound box/tote. In some cases, cameras and/or vision systems are employed to enhance the accuracy and speed of the picking robot.

In some examples, step 230 can, alternatively or additionally, comprise a different type of picking process (e.g., different than a picking robot as described above). For example, in some cases step 230 is performed partially or fully manually by one or more workers. In another example, step 230 can be performed partially or fully using a teleoperated picking system (e.g., where a human operates one or more picking machines/processes remotely).

At step 232, after processing in the robotic item picking cell, inventory totes are robotically transferred (by a mobile robot) back into the queue (step 216), back to dense inventory storage 210, to another robotic item picking cell, to a replenishment station (a decantation or singulation process station), to a buffer, to a service area (e.g., a quality check area, an error-correction station, etc.), or elsewhere as determined by the control system of the flow center, the control system of the robotic picking cell(s), the mobile robot storage controller, and/or other control systems involved in the performance of the order fulfillment process 200. In some cases, the control system of the flow center can determine, facilitate, and control such movements of the inventory totes as necessary to optimize the overall efficiency of the flow center. It should be understood that, in some cases, the control system of the flow center can encompass and/or communicate with other control systems such as, but not limited to, the control system of the robotic picking cell(s), the mobile robot storage controller, and the like, without limitation.

At step 234, outbound containers that have received one or more sellable items but need to receive at least one more prior to shipment (a/k/a "an incomplete outbound box/tote") can be robotically transferred (via a mobile robot) back into the queue for the robotic item picking cell (step 218), or to the queue of another robotic item picking cell.

At step 236, boxes that will be shipped directly to a customer are robotically transferred (via a mobile robot) to a packaging station area. This packaging step can include various processes such as, but not limited to, placement of packing materials (dunnage) in the box, box sealing, labeling the box, gift-wrapping, and the like.

At step 238, outbound containers for store replenishment orders and/or forward-deployed inventory orders are robotically transferred (via a mobile robot) to an outbound buffer area of the flow center.

While step 236 pertains to outbound containers that will be shipped directly to customers and step 238 pertains to outbound containers that will be shipped to stores, it should be understood that the order fulfillment process 200 can also be used similarly to prepare outbound containers that will be shipped to another type of facility such as, but not limited to, a warehouse, a distribution center, another flow center, and the like.

At step 240, the sequence of outbound containers for store replenishment orders and/or forward-deployed inventory orders is optimized by the control system of the flow center. The optimization is performed with a view towards the future arrival at a store of the outbound containers, and more particularly towards optimization of efficiencies related to putting the sellable items from the outbound containers onto store shelves or into backroom inventory. As one example, two or more outbound containers that are destined for stocking a particular same aisle of a store may be positioned next to each other in a trailer of a semi-truck shipment. In addition, the sequence and location of the individual items placed in the outbound shipping containers that are going to stores can be optimized for efficient store put-away-to-shelves. For example, the items that will be put into stock locations first can be placed on top of the other units. In another example, the outbound shipping containers that are going to stores may be subdivided into multiple separated compartments for ease of selection when putting the products on the shelves at the store.

At step 250, completed outbound boxes and totes are transferred to the shipping area and loaded into trucks or trailers. In some cases, the mobile robots are used to perform the transfer of individual boxes and/or totes. In some cases, the completed outbound boxes can be transferred and loaded manually, or another type of conveyance system can be additionally or alternatively used. In all instances, the trailer can be loaded such that multiple destinations can be serviced by the delivery truck along a particular delivery route with the products for each destination grouped together in the trailer in reverse sequence order of the specific destinations visited along the delivery route.

The order fulfillment process 200 can be considered, in some embodiments, to generally include three process portions: (i) storage and retrieval (steps 210-214), (ii) order sortation (steps 216-234), and (iii) sequencing of outbound containers (steps 236-250). In some embodiments, all three portions of the order fulfillment process 200 are integrated into an essentially single, all-in-one type of system. In some embodiments, some or all of the three portions of the order fulfillment process 200 are separate systems or modules that function essentially separately, but in conjunction with each other, to perform the order fulfillment process 200.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, a trackball, or a touchscreen, etc.) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, tactile input, eye movement tracking input, a brain-computer interface, gesture input, and the like, and combinations thereof).

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

What is claimed is:

1. A method of preparing a shipment of an order of sellable items for a store, the method executed by a control system in response to receiving the order, the method comprising:
    causing a first item for the order to be transferred from an inventory storage area to a first queue prior to a robotic picking cell;
    causing a first resequencing of items in the first queue;
    causing a first outbound container to enter a second queue prior to the robotic picking cell;
    causing a first resequencing of outbound containers in the second queue;
    causing a robot of the robotic picking cell to transfer the first item into the first outbound container;
    after the transfer of the first item into the first outbound container, causing the first outbound container to enter an outbound container queue; and
    causing a first resequencing of outbound containers in the outbound container queue, wherein the first resequencing of the outbound containers in the outbound container queue is based on an inventory layout of the store.

2. The method of claim 1, further comprising:
    after the transfer of the first item into the first outbound container and prior to the causing the first outbound container to enter the outbound container queue, causing the first outbound container to reenter the second queue.

3. The method of claim 2, further comprising:
    after causing the first outbound container to reenter the second queue, causing a second resequencing of outbound containers in the second queue.

4. The method of claim 3, further comprising:
    after the second resequencing of the outbound containers in the second queue, causing the robot to transfer a second item for the order into the first outbound container.

5. The method of claim 1, wherein the first item for the order is in a first inventory container while being transferred from the inventory storage area to the first queue, and wherein the robot transfers the first item into the first outbound container by picking the first item out of the first inventory container.

6. The method of claim 5, further comprising:
    after the picking of the first item out of the first inventory container, causing the first inventory container to be transferred to the inventory storage area.

7. The method of claim 5, further comprising:
    after the picking of the first item out of the first inventory container, causing the first inventory container to reenter the first queue.

8. The method of claim 7, further comprising:
    after causing the first inventory container to reenter the first queue, causing a second resequencing of items in the first queue.

9. The method of claim 1, wherein the first resequencing of the items in the first queue is performed by moving the items around using mobile robots.

10. The method of claim 1, wherein the first resequencing of the outbound containers in the second queue is performed by moving the outbound containers around using mobile robots.

11. The method of claim 1, wherein the first resequencing of the outbound containers in the outbound container queue is performed by moving the outbound containers around using mobile robots.

12. An order fulfillment system, comprising:
    a plurality of inventory containers;
    a plurality of differing types of sellable items, each inventory container containing one or more of a single type of the sellable items;
    a plurality of outbound containers;
    a robotic picking cell comprising a picking robot configured to transfer one or more individual sellable items from a respective one of the inventory containers in the robotic picking cell to a respective one of the outbound containers in the robotic picking cell; and
    a control system configured and operable to:
        cause a first sellable item of the plurality of differing types of sellable items, and that is ordered for shipment to a store, to be transferred from an inventory storage area to a first queue prior to the robotic picking cell;

cause a first resequencing of sellable items in the first queue;

cause a first outbound container of the plurality of outbound containers to enter a second queue prior to the robotic picking cell;

cause a first resequencing of outbound containers in the second queue;

cause a robot of the robotic picking cell to transfer the first sellable item into the first outbound container;

after the transfer of the first sellable item into the first outbound container, cause the first outbound container to enter an outbound container queue; and cause a first resequencing of outbound containers in the outbound container queue, wherein the first resequencing of the outbound containers in the outbound container queue is based on an inventory layout of the store.

13. The order fulfillment system of claim 12, further comprising:

a plurality of first mobile robots that each releasably engage and transport any individual inventory container of the plurality of inventory containers; and a plurality of second mobile robots that each releasably engage and transport any individual outbound container of the plurality of outbound containers.

14. The order fulfillment system of claim 13, wherein the control system is configured and operable to control movements of the plurality of first mobile robots and the plurality of second mobile robots in order to cause the first resequencing of the sellable items in the first queue.

15. The order fulfillment system of claim 14, wherein the control system is configured and operable to control movements of the plurality of first mobile robots and the plurality of second mobile robots in order to cause the first resequencing of the outbound containers in the second queue.

16. The order fulfillment system of claim 15, wherein the control system is configured and operable to control movements of the plurality of first mobile robots and the plurality of second mobile robots in order to cause the first resequencing of outbound containers in the outbound container queue.

17. The order fulfillment system of claim 12, wherein the first resequencing of the outbound containers in the outbound container queue is also based on an efficient technique for stocking shelves of the store.

18. The order fulfillment system of claim 12, wherein the control system is further configured and operable to:

after the transfer of the first item into the first outbound container and prior to the causing the first outbound container to enter the outbound container queue, cause the first outbound container to reenter the second queue.

19. The order fulfillment system of claim 18, wherein the control system is further configured and operable to:

after causing the first outbound container to reenter the second queue, cause a second resequencing of outbound containers in the second queue.

20. The order fulfillment system of claim 12, wherein the control system is further configured and operable to:

after the picking of the first item out of the first inventory container, cause the first inventory container to reenter the first queue; and after causing the first inventory container to reenter the first queue, cause a second resequencing of items in the first queue.

* * * * *